Patented Jan. 22, 1924.

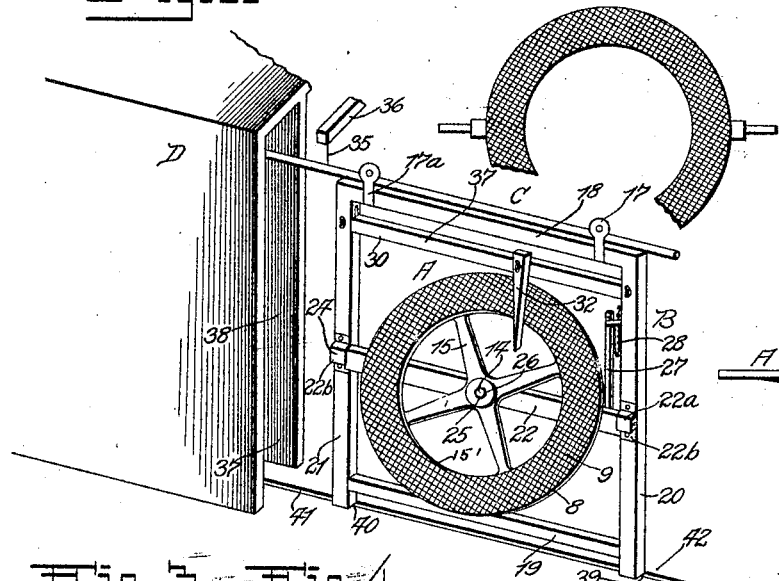

1,481,275

UNITED STATES PATENT OFFICE.

ALBERT O. SCHRAMM, OF LOS ANGELES, CALIFORNIA.

APPARATUS FOR STRETCHING LAUNDERED ARTICLES FOR DRYING.

Application filed May 8, 1920. Serial No. 379,953.

*To all whom it may concern:*

Be it known that I, ALBERT O. SCHRAMM, a citizen of the United States, residing at Los Angeles, in the county of Los Angeles and State of California, have invented new and useful Improvements in Apparatus for Stretching Laundered Articles for Drying, of which the following is a specification.

This invention relates to apparatus for stretching laundered articles for drying and it has for its object to provide improved apparatus of the general nature stated whereby such articles as pieces of drawn work, battenberg, center pieces and the like, of circular, oblong, regular or irregular contour or outline may be properly supported and handled in a stretched condition for drying. A further object of the invention is to provide apparatus which will greatly facilitate the handling and manipulation of fabric articles of various sizes and forms in laundries where large numbers of such articles are laundered and dried and by means of which such articles may be conveyed as well as supported in properly stretched condition in carrying out the stretching and drying process and whereby the original outlines of the articles may be restored.

In accordance with the invention, and in the preferred practice thereof, I provide a circular frame having one of its faces, or portions thereof, covered with a multiplicity of radially or outwardly directed points or hooks upon which marginal portions of the article to be dried may be hooked, and with the article in stretched condition, whereby upon drying, a circular or irregular object accommodated upon the proper points, will have its original outline restored; furthermore, in case of embroidery or other raised work on the surface of the article, such raised work will be raised during the stretching and drying operation to stand out in relief in accordance with the original design thereof.

In further carrying out the invention, I may provide supporting means for the frame and such supporting means may comprise a support upon which the frame is rotatably mounted, so that the marginal edges thereof and the marginal edges of an article placed thereon may be moved past an operator's position, to the end that the operator may properly position successively presented marginal portions of the article upon such points or hooks as will best serve to hold the margin of the article in the pattern of its original outline; when the circular frame is provided in the form of a relatively narrow annulus, of proper diameter to match the circular article, the frame per se may serve as a circular guide whereby the operator will be guided in hooking the edge of the circular article upon the points; however, I may provide indicating means, preferably adjustable, whereby the operator is guided in selecting the proper points upon which to hook marginal portions of the article.

To facilitate the handling of the articles to be stretched and dried, I may provide supporting means comprising a frame carrier adapted to be moved into and out of a suitable kiln. The preferred form of such carrier comprises a wheeled device suspended from a track extending from the interior of the kiln to a suitable loading or unloading station, and upon which carrier the frame may be mounted for rotation about its own axis and for tilting from horizontal or article-receiving position to a position where it will lie in or nearly in a vertical plane, for positioning in the kiln.

A further object of the invention is to provide apparatus of the general character stated which will be relatively simple and inexpensive in construction and organization when its advantages such as high efficiency, facility in adjustment and manipulation, and general superiority in service are considered.

With the above and other objects in view, the invention consists in the novel and useful provision, formation, combination, association and inter-relation of parts, members and features, all as hereinafter described, shown in the drawing, and finally pointed out in claims.

In the drawing:

Figure 1 is a fragmentary perspective view of apparatus organized in accordance with the invention;

Figure 2 is an end elevation of a portion of the showing in Figure 1, and looking in the direction of the arrow near Figure 1, the annular frame being shown in this figure, however, in horizontal position;

Figure 3 is a face view of a frame embodying the invention;

Figure 4 is an enlarged detail face view of a fragment of the frame shown in Figure 3;

Figure 5 is a detail sectional view taken on the line X⁵—X⁵, Figure 3, and looking in the direction of the appended arrows;

Figure 6 is a fragmentary perspective view of a modified form of the apparatus;

Figure 7 is a plan view of a still further modified form of the apparatus;

Figure 8 is an enlarged side elevation of one of the segments shown in Figure 7; and Figure 9 is a fragmentary face view of a modified form of stretching frame similar to the frame A shown in Figure 1 and adapted for use in substitution therefor in the carrier B where it may be received in the journal bearings thereof 22$^a$ and 22$^b$ of the member 22.

The parts in the several figures are designated by reference characters.

Referring with particularity to the drawing, in the embodiment of the invention shown in Figures 1 to 5, inclusive, A designates a stretcher frame, B designates carrier means for supporting the frame A, C designates, in each instance, a track for the carrier means B of one of the frames A, and D designates a kiln into which the tracks C extend.

The frame A, in each instance, is shown as comprising an annulus 8 of suitable material, such as wood or metal, the upper face 9 of which is covered with carding cloth 10 which has a multiplicity of upwardly and outwardly directed points forming hooks 11 at its exposed surface; such carding cloth, in addition to the hooks 11, comprises a fabric or woven body 12 from which the hooks 11 extend; in applying the carding cloth to the annulus 8, such cloth may be cut into sector-like pieces 8$^a$, each nailed or riveted to the annulus 8, as at 13, and so providing an annular stretching frame the points of which are all directed peripherally and upwardly, diametrically opposite points being oppositely directed so that a circular object having its marginal portion hooked on certain of the points will be drawn taut during the drying process. An article so placed upon the frame may be allowed to dry thereon in any position or condition in which it is desired to place the frame. In order to adapt the frame for engagement and proper support by suitably formed supporting means, upon which it may be rotatably mounted, I may provide a central hub 14 having arms 15 the outer ends of which are secured to the under side of the annulus, the hub and arms preferably lying entirely outside of the plane of the points or hooks 11, so that such plane may be occupied by the stretched article. A plurality of sizes of the annular frames A may be provided, in order to meet the requirements of the various sizes of objects or articles to be laundered, and the point covered annular surface of each frame may be of a width sufficient to accommodate the marginal edges of several sizes of circular or oblong objects or articles, between the inside edge 15′ and the outside edge or periphery 16 thereof.

The frame A illustrated in Figure 3 is shown as having an outside diameter just equal to the inside diameter of the frame A shown in Figures 1 and 2, to illustrate how a whole series of frames may be provided, from the largest that may be required to stretch large circular objects to a frame of very small size, such as would be required for small doilies and the like.

The carrier means B, may comprise, in each instance, a suitable supporting frame, means for pivotally supporting the frame A thereon, and a pair of pulleys or wheels 17 secured to the carrying frame.

Each supporting frame may comprise an upper horizontal member 18, a lower horizontal member 19, a vertical head end member 20, and a vertical tail end member 21, all secured together in any suitable manner to provide a substantial and rigid preferably rectangular frame; the pulleys or wheels 17 are secured to the upper horizontal member 18 by means of their respective frames 17$^a$, which frames 17$^a$ lie at one side of the respective pulleys 17, in order to be clear of the track hangers as the frame is moved along the respective track C.

The means for pivotally supporting the frame A, in each instance, comprises a horizontally disposed member 22 rotatably mounted in the carrier frame as by means of a journal 22$^a$ provided on the member 22 at its head end and received in a journal 22$^b$ provided on the member 22 at its tail end and received in a journal box 24 on the frame member 21; at a point midway between its ends, the member is provided with an outstanding pivot 25 which is at right angles to the axis of rotation in its journal boxes 23 and 24. The hubs 14 of the annular frames A are apertured as at 26, to fit the pivot 25, the frame A in Figure 1 being shown as rotatably mounted upon the pivot 25; the pivot 25 so constitutes means for rotatably mounting the frame A. In case it is desirable to substitute a frame A of a different size for the frame A shown as mounted upon the member 22, it is only necessary to remove the nut 25$^a$ and washer 25$^b$ provided on the threaded outer end of the pivot 25, and substitute another size frame A for the one priorly provided upon the member 22. A radial arm 27 may be provided upon the member 22 and a chain or other flexible member 28 may have its one end secured to the outer end of the arm and its other end secured to the head end member 20, as at 20$^a$, to limit the rotation of the member 22 in one direction and so hold the frame A in a horizontal plane; and an abutment 27$^a$ may be provided upon said arm to engage the head end member 20 and so limit the rotation of the member 22 in the opposite direction, and preferably at the point in its rotation where the frame A will be held in a position slightly inclined to the vertical; that is, so that the frame A may be moved to horizontal position for the removal and placing of articles thereon, and then moved through an arc of slightly more than 90 degrees to slightly invert the frame A, and so expose what was the "upper surface" of the article when the frame was in horizontal position to the upwardly ascending air currents in the kiln. A latch 29 may be provided to hold the frame A against accidental movement to horizontal position.

An indicating means comprising a horizontal strip 30 bearing indicia 31, and a slidable depending pointer 32 mounted slidably upon the strip 30 may be provided, the strip 30 being shown as extending from the member 20 to the member 21; such indicator may be detachably applied when desired, and the indicia preferably reads in terms of linear measurement, so that an operator may set the pointer 32 to indicate the desired radius or diameter to which the article should be stretched as the article is applied to the annular frame points as its successively presented marginal portions pass under the pointer. A set screw 33 enables the operator to fix the pointer to the strip at the desired point.

Each track C may comprise a rail suspended by hangers 35 from a suitable framework 36 and from the ceiling of the kiln D, and each track may lead into the kiln D from any suitable portion of the laundry where the articles are to be applied to or removed from the frames A.

The kiln D is shown as a housing or drying room having a plurality of suitable doors 37, each covering a relatively narrow vertical opening 38; I preferably have two tracks leading into the kiln through each opening 38.

The members 20 and 21 are provided at their lower ends with guide splines or teeth 39 and 40, respectively, and I provide a slot 41 in the floor 42, or an equivalent channeled guide rail, under each of the rails 34, the teeth 39 and 40 of the respective carrier means taking into the slots 41, so steadying and guiding the lower edge of each carrier and increasing the stability and efficiency of the apparatus.

In the modified form of the invention shown in Figure 6, 43 designates a table upon which are mounted horizontal members 44 and 45. A vertical central pivot 46 is provided upon the table and a rotatable disc or stretcher frame A' having a central aperture to receive the pivot 46 is mounted thereupon. Rollers 47 are provided upon the members 44 and 45 near the periphery of the stretcher frame the under surface of which bears on such rollers. Uprights 48 on the member 44 support a detachable transverse bar or indicating means support 49 which is held to the uprights by removable pins 50. An indicating means 51 is removably pinned to an upright 52 supported by member 45 by pin 53 and to the transverse bar 49 by pin 54. The overhanging end 54 of the indicating means member 51 is provided with indicia indicating the radial distance of the pointer 55 from the center or axis of stretcher frame rotation. The pointer 55 is apertured as at 55ª to slide upon the member 51 and may be held in any position of adjustment over the stretcher frame by a thumb screw 56. The stretcher frame A' has an annular portion of its upper surface covered with carding cloth, which is shown as cut into sectors and applied to such surface portion; the points on the carding cloth are all directed radially and peripherally outward. If desired the entire upper surface of the stretcher frame A' may be covered with carding cloth.

In the form of the invention shown in Figure 7, a disc or stretcher frame A'' is shown diagrammatically; a plurality of attachable segments 57 adapted to be grouped in a circle, large or small, as may be required, or in oblong formation, or other form, are shown; each segment 57 comprises a block 58 the upper surface of which is covered with carding cloth with the points directed toward the outer circular edge thereof; the under surface of the block is provided with a plurality of pins 59 adapted to be received in small apertures not shown in the stretcher frame A'' or adapted to be pressed into the material of such frame if the same be constructed of wood. I may provide a series of diametrical lines or marks across the face of the frame or disc A'' to aid in determining the attachment points of oblong or non-circular or otherwise irregular articles. The disc or frame A'' has a central aperture adapted to fit upon the pivot pin of the table shown in Figure 6 or upon the corresponding pivot pin of the carrier frame shown in Figures 1 and 2. The segments 57 when grouped in a small circle may have meeting adjacent edges as to 61 and when otherwise grouped may have divergent adjacent edges as at 62. Enough of the blocks are preferably provided with each disc frame A'' to complete a circle near its periphery.

The operation, method of use and advantages of the invention will be readily understood from the foregoing disclosure, taken in connection with the accompanying drawings and the following statement:

A washed article may be placed upon any of the discs or annuli shown and the operator hooks the marginal edges thereof upon the hooks or points which lie in the proper position to hold the article in its original shape. When the pointer is used for circular articles it is moved along its supporting member to the point where the proper radius is indicated and set by tightening the set screw. A marginal portion of the article may then be hooked on the points underlying the pointer and the disc rotated and the successively presented following marginal portions hooked in the same manner under the pointer until the circle has been completed.

In laundering an oblong or irregular article in connection with the use of the form of the invention shown in Figure 7, the disc may be placed in position under the indicator on the pivot of the table or carrier frame, and the article stretched thereon before washing and its measurement taken on two or more of the diametrically disposed lines or marks and a record or chart made of its measurements on each such line; the measuring may be done by rotating the disc to bring each portion of the article under the indicating pointer and sliding the pointer in and out on its supporting member, taking a reading of the radius of the article on each line or mark. The article may then be removed from the hooks or points, washed and passed through the wringer, and then replaced on the disc and in accordance with its chart, stretched to its original position by setting the pointer at the positions required at each line or mark as the disc is rotated, and hooking the margin of the article to the points under the pointer.

The articles are preferably left in such stretched condition on their respective discs or annuli until the drying operation is completed either in the kiln or under other conditions when no kiln is provided.

When the form of the invention shown in Figures 1 and 2 is used, the annulus is lowered to horizontal position, a washed article hooked thereon, and the annulus moved to its vertical position and secured by means of the catch, whereupon the kiln door may be opened and the carrier moved along the track to convey the annulus and the washed article into the kiln for drying.

Having thus disclosed my invention, I claim and desire to secure by Letters Patent:

1. Apparatus of the character disclosed comprising a rotatable member mounted for rotation about an axis at right angles to its face, means for engaging and holding circular washed articles of varying diameters to said member, and carrier means upon which said member is rotatably mounted.

2. Apparatus of the character disclosed comprising a rotatable member mounted for rotation about an axis at right angles to its face, means for engaging and holding circular washed articles of varying diameters to said member, and carrier means upon which said member is rotatably mounted; said engaging means being formed for engagement with the washed articles at their marginal portions and to hold the same to said member in stretched condition for drying.

3. Apparatus of the character disclosed comprising a rotatable member mounted for rotation about an axis at right angles to its face, means for engaging and holding circular washed articles of varying diameters to said member, and carrier means upon which said member is rotatably mounted; said engaging means being formed for engagement with the washed articles at their marginal portions and to hold the same to said member in stretched condition for drying; and said carrier means comprising a wheeled member whereby said first named member may be conveyed to a suitable place for drying said washed articles.

4. Apparatus of the character disclosed comprising a rotatable member mounted for rotation about an axis at right angles to its face, means for engaging and holding circular washed articles of varying diameters to said member, and carrier means upon which said member is rotatably mounted; said carrier means comprising a frame, a member rotatable in said frame, and wheels for said frame.

5. Apparatus of the character disclosed comprising a rotatable member mounted for rotation about an axis at right angles to its face, means for engaging and holding circular washed articles of varying diameters to said member, and carrier means upon which said member is rotatably mounted; said carrier means comprising a frame, a member rotatable in said frame, and wheels for said frame; said first named member being rotatably mounted upon said second named member.

6. Apparatus of the character disclosed comprising a rotatable member, means for engaging and holding circular washed articles of varying diameters to said member, and carrier means upon which said member is rotatably mounted; said carrier means comprising a frame, a member rotatable in said frame, and wheels for said frame; said first named member being rotatably mounted upon said second named member; and there being means for limiting the rotary movement of said second named member and whereby said first named member may be supported either in a horizontal plane or in a plane approximating the vertical.

7. Apparatus of the character disclosed comprising a rotatable member, means for engaging and holding circular washed articles of varying diameters to said member, and carrier means upon which said member is rotatably mounted; said carrier means comprising a frame, a member rotatable in said frame, and wheels for said frame; said first named member being rotatably mounted upon said second named member; and there being means for limiting the rotary movement of said second named member and whereby said first named member may be supported either in a horizontal plane or in a plane approximating the vertical; said last named means comprising a flexible member.

8. Apparatus of the character disclosed comprising an annular member, and means for engaging and holding circular washed articles to said member; said engaging means being formed for engagement with the washed articles at their marginal portions and to hold the same to said member in stretched condition for drying and comprising a multiplicity of radially outwardly directed points generally distributed over the face of the annular member.

9. Apparatus of the character disclosed comprising an annular member, and means for engaging and holding circular washed articles to said member; said engaging means comprising a multiplicity of points formed for engagement with the washed articles at their marginal portions and to hold the same to said member in stretched condition for drying.

10. Apparatus of the character disclosed comprising a carrier, and a flat member rotatable about an axis at right angles to its face and having a surface provided with a plurality of points arranged to have circular or irregular washed articles hooked thereon tiltably and rotatably mounted on said carrier.

11. Apparatus of the character disclosed comprising a carrier, a flat member rotatable about an axis at right angles to its face and having a surface provided with a plurality of points arranged to have circular or irregular washed articles hooked thereon tiltably and rotatably mounted on said carrier, and a track for said carrier.

12. Apparatus of the character disclosed comprising a carrier, a flat member rotatable about an axis at right angles to its face and having a surface provided with a plurality of points arranged to have circular or irregular washed articles hooked thereon tiltably and rotatably mounted on said carrier, and a track for said carrier; there being means for confining the tilting movement of said member between definite limits.

13. Apparatus of the character disclosed comprising a carrier, and a flat member having a plurality of points adapted to engage marginal portions of a circular washed article to hold the same in stretched condition for drying; said member being removably mounted upon said carrier.

In testimony whereof, I have signed my name to this specification in the presence of two subscribing witnesses.

ALBERT O. SCHRAMM.

Witnesses:
ALFRED H. DAEHLER,
W. L. ELDER.